Nov. 29, 1949 T. J. LEHANE 2,489,652
AUTOMATIC TEMPERATURE CONTROL SYSTEM
Filed Jan. 27, 1947 3 Sheets-Sheet 1

INVENTOR.
Timothy J. Lehane
BY Harvey M. Gillespie
Atty.

Patented Nov. 29, 1949

2,489,652

UNITED STATES PATENT OFFICE 2,489,652

AUTOMATIC TEMPERATURE CONTROL SYSTEM

Timothy J. Lehane, Chicago, Ill., assignor, by mesne assignments, to Vapor Heating Corporation, Chicago, Ill., a corporation of Delaware Application January 27, 1947, Serial No. 724,658

10 Claims. (Cl. 257—3)

This invention relates to improvements in temperature control systems and has for its principal object the provision of improved means for controlling the operations of temperature altering apparatus so that the apparatus will function to deliver heat into an enclosed space or to withdraw it therefrom in sufficient quantities to maintain a suitable temperature within said space.

Another and more specific object is to provide, in a temperature control system, a primary heating system, which is available throughout the entire heating range; a secondary heating system which is available for use during only a portion of the heating range, as measured by the outside temperature; and a cooling apparatus which functions above a predetermined inside temperature when the outside atmosphere is above a prescribed temperature.

Another object is to provide in a temperature control apparatus of the above character, control devices for the primary heating system which are automatically selected, by means responsive to predetermined outside temperatures, to control the operation of the heating system, whereby one of said control devices has control of the primary heating system below a prescribed temperature range when cooling is not required and another control device assumes control of said heating system when the cooling apparatus is actuated.

Another object is to provide in a temperature control system of the above character, cooperative connections between the heating and cooling control devices, whereby the cooling control device may temporarily relinquish its control of the system without transferring the control to the heating control device. The invention includes as one specific arrangement for accomplishing this object, connections whereby the functional setting of the heat control device is adjusted to a temperature setting substantially lower than the cooling control device and will hold such adjusted setting for a period of time after the cooling control device has relinquished its control over the system.

The invention briefly described includes a primary heating system, a secondary heating system and a cooling system which are controlled by means including outside and inside thermostats which cooperatively function to control the temperature of an enclosed space. The space may be any enclosure composed of single or a plurality of compartments.

The primary heating system includes an overhead radiator for heating air preliminary to delivering it into the enclosed space. The secondary heating system includes one or more floor heaters which are separately controlled and are arranged to add heat directly to the atmosphere within the enclosed space. The controls for the primary and secondary heating systems function to automatically adjust the functional setting of the control having charge of the primary heater, so as to deliver air at higher temperatures into the space, when the outside temperature is at or below a predetermined minimum, for example zero degrees, and to reduce the temperature of the air delivered into the space or spaces when the outside temperature is above said predetermined minimum.

When the outside temperature reaches a predetermined higher temperature, for example 50° Fahrenheit, the secondary heating system is automatically deactivated. However, at any temperature below the said 50° Fahrenheit, the individual heaters are automatically controlled individually and their effectiveness may be raised or lowered by manual adjustment of the functional setting of separate control device, whereby different temperatures may be maintained in different compartments or more or less heat may be introduced into different zones of the heated space.

The controls for the cooling system are put into control of the temperature of the enclosed space when a predetermined maximum inside temperature is reached, providing also that the outside atmosphere is above a prescribed temperature. When this condition occurs, additional auxiliary heat is applied to the thermostat then in control of the primary heating system so as to lower its functional setting to a point lower than the functional setting of the cooling control thermostat. In this way the cooling control thermostat may relinquish its control temporarily and thereafter resume its control before the heater control thermostat has cooled sufficiently to regain its initial functional setting and thereby take control of the system.

A further object of the invention includes the provision of an improved temperature control system constructed to function substantially in the manner above briefly described and including the structures and arrangements or their equivalents hereinafter more fully described.

One approved form of temperature control system for performing the functions as above described is shown in the accompanying drawings wherein.

Figure 1:
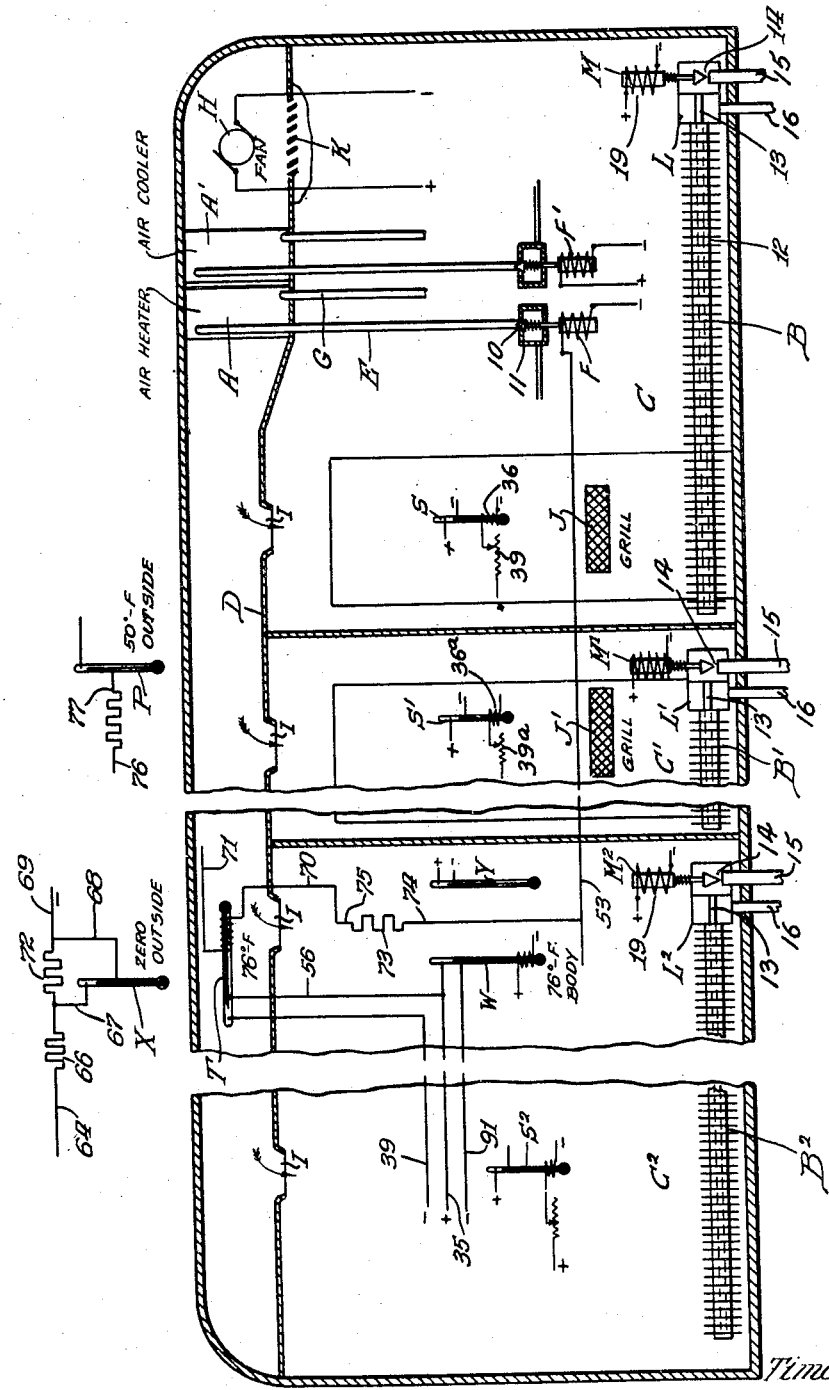
Fig. 1 is a diagrammatic outline showing a railway car provided with a plurality of compartments and provided with a temperature control system constructed and functioning in accordance with this invention.
Figure 2:
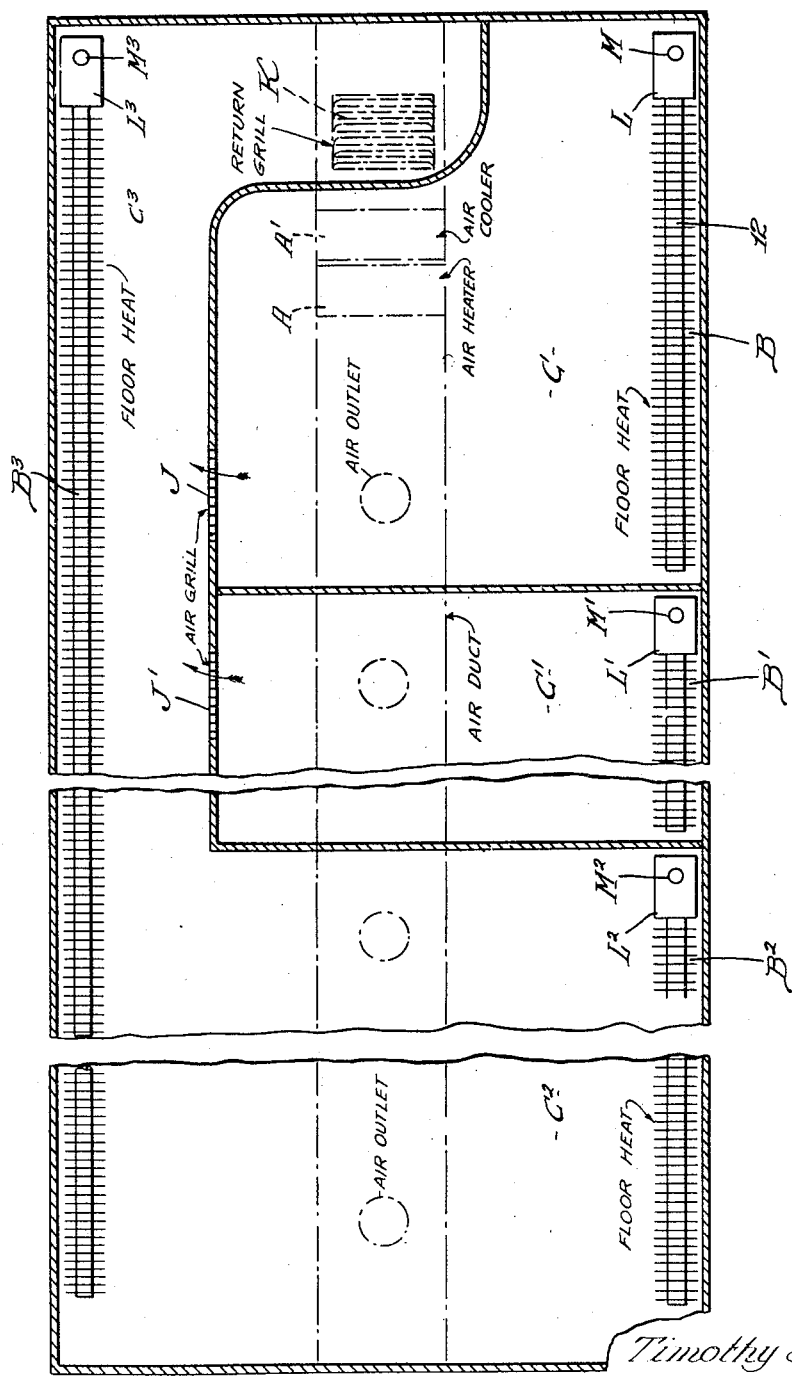
Fig. 2 is a plan view of the railway car shown in Fig. 1.

According to the present invention the heating function of the system is performed by a primary heater A and one or more secondary heaters B. Inasmuch as the car C is divided into several compartments C, C¹, C², C³, etc., the secondary heaters for the several compartments are designated B, B¹, B², B³, etc.

PRIMARY HEATER

The primary heater A is preferably positioned in a duct D which extends lengthwise of the car near the roof. Heating medium, for example steam or hot water, is supplied to the heater through an inlet pipe E. A valve structure controls the supply of heating medium in accordance with the heating requirements. The valve structure includes a valve 10 positioned within a casing 11. The valve is opened by the energization of valve solenoid F.

The spent heating medium is discharged from primary heater A through pipe G. An electrically operated fan H draws air from the space being heated and forces it through the primary heater A. The air may be heated to any desired temperature, for example 76° Fahrenheit, and delivered through ports I into the several compartments C, C¹, C², C³, etc., of the car. The air is withdrawn from the compartments C, C¹ through grills J, J¹ and from the other compartments and passed upwardly through return air grill K, where it is forced by fan H through the heater A and thereafter returned to the compartments.

SECONDARY HEATERS

The secondary heaters add heat directly to the air within the several compartments of the space whose temperature is being controlled. In the present case, the secondary heaters are floor radiators B, B¹, B², B³, etc. Each floor radiator is of identical construction and comprises in each case an outer finned pipe 12, an inner concentric feed pipe 13 which receives heating medium from a valve structure L and delivers it into the outer pipe 12 near the outer end of the radiator. The supply of heating medium is controlled by a normally open valve 14 which is closed by the energization of a valve solenoid M, M¹, M², M³, etc. The inlet pipe of valve structures L for each radiator is designated 15 and the discharge pipe is designated 16.

HEATING SYSTEM CONTROL

The primary heater and the secondary heaters are controlled by a relay N which is held by a spring 17 in a position to close certain of its contacts and is moved by the energization of solenoid O, to a position to open the said closed contacts and to close certain other contacts thereof. The energization of solenoid O is controlled by a thermostat P which is responsive to outside temperatures. Preferably the thermostat P is set to function at a predetermined temperature, for example 50° Fahrenheit, to close an energizing circuit through the relay solenoid.

HEAT CONTROL

Outside temperature below 50° Fahrenheit

Figure 3:
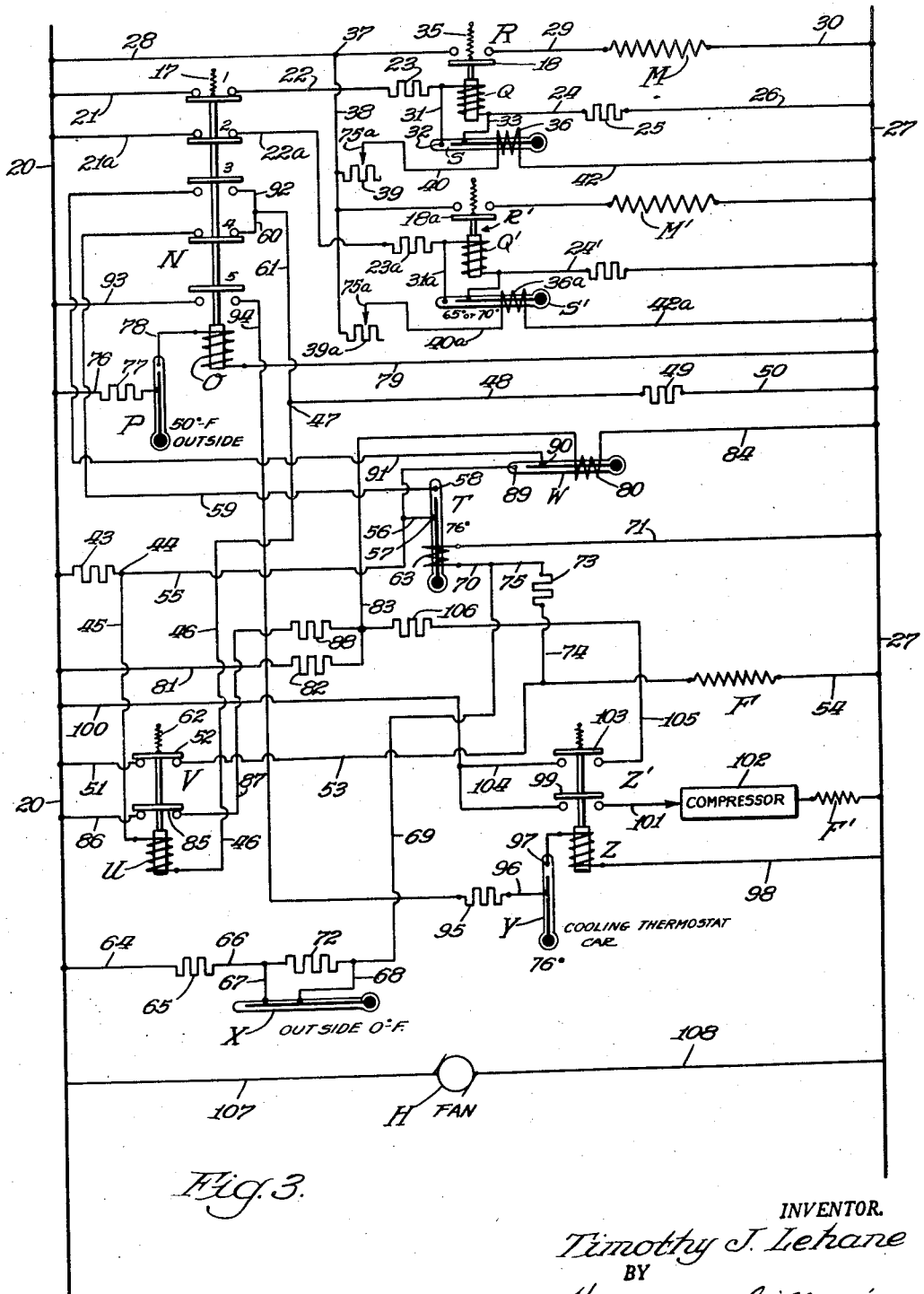
Fig. 3 is a wiring diagram showing the cooperative connections between the several control devices for bringing about the control functions above described.

Assuming that the outside temperature is below 50° Fahrenheit, the relay N will be de-energized and the spring 17 will function to hold the contact arms 1, 2 and 4 in their closed position. The closed contact arm 1 closes an energizing circuit through an actuating solenoid Q of a relay R so as to move its arm 18 into a position to de-energize floor radiator valve solenoid M and thereby permit the radiator valve 14 to open by the action of spring 19. The energizing circuit for solenoid M is as follows:

The energizing circuit for solenoid M, shown in Fig. 3, leads from the positive line 20 through wire 21, closed contact 1 of relay N, wire 22, resistor 23, solenoid Q, and thence through wire 24, resistor 25, and wire 26 to the negative line 27. This energization of solenoid Q, as before indicated, opens a circuit through the solenoid M, the said circuit being as follows: Main line 20, wire 28, closed contact 18 of relay R, wire 29, solenoid M and wire 30 to the negative line 27.

The solenoid M is illustrated in the drawing as controlling the admission of heating medium to the floor radiator B located in one compartment C of the car. Inasmuch as the car will ordinarily comprise a number of individual compartments and may also include an open space for passengers, the floor radiators are each provided with individual thermostats which may be adjusted to function at different temperatures and which are adapted to bring about the closing of the inlet valve of its associated radiator when the temperature of the compartment reaches a predetermined point. A thermostat S is positioned in the compartment C so as to respond to the temperature thereof and is connected in a shunt circuit adapted to by-pass the electric current around the solenoid Q when the temperature of the compartment C reaches the functional setting of the thermostat. This shunt circuit leads from the positive side of the solenoid Q through wire 31 to the upper contact 32 of thermostat S. Another wire 33 leads from the lower contact 34 of said thermostat to the negative side of the solenoid Q. It will be seen therefore that when the temperature of space C reaches the functional setting of thermostat S the electric current will be by-passed around the solenoid Q and thereby permits the spring 35 of the relay to move contact 18 into its closed position. The closing of this relay energizes solenoid M and therefore closes the radiator valve structure L. In order to vary the temperature setting of thermostat S, it is provided with an auxiliary heater 36 which is supplied with heating current through a circuit leading from positive line through wire 28 to terminal 37, thence through wire 38, variable resistance 39, wire 40, auxiliary heater 36 and wire 42 to the negative line 27. The variable resistance 39 is preferably such that the functional setting of thermostat S may be adjusted to function at temperatures between 60° and 80°.

The floor heaters of the other compartments of the car are controlled by corresponding electric circuits connected through other contacts of the relay N, but the circuits are otherwise identical with the circuit for controlling the solenoid Q above described. Only one additional floor radiator control circuit is illustrated in Fig. 3. It is connected through contact 2 of relay N and controls the energization of the solenoid Q¹ of relay R¹ which, in turn, controls the floor radiator valve solenoid M¹. Inasmuch as the circuits are substantially identical, the various wires and resistors are identified with the same reference characters having an exponent $a$, and the relay, thermostat and radiator valve solenoid are identified with the same reference letters having the exponent 1.

Simultaneously with the closing of circuits to admit heating medium to the floor radiators, a circuit is closed through the closed contact 4 of relay N to energize and therefore open the overhead radiator valve F. Assuming that the thermostat T is unsatisfied, the circuit leads from positive line 20 through resistor 43 to a terminal 44, thence through wire 45, solenoid U of overhead relay V, wire 46 to terminal 47, and thence through wire 48, resistor 49 and wire 50 to the negative line 27. This circuit energizes the relay V and thereby closes an energizing circuit through the solenoid F to open the inlet valve 10 of the air heater A so as to supply heating medium thereto. This circuit leads from positive line 20 through wire 51, contact 52 of relay V, wire 53, solenoid F, and wire 54 to negative line 27. The relay V is controlled by one or the other of the thermostats T or W depending upon the position of the relay N. When the said relay N is de-energized the thermostat T has control of the said relay V and therefore controls the energization of the overhead valve solenoid F. This control is effected through a circuit leading from terminal 44 through wire 55, 56 to the lower contact 57 of thermostat T, and thence from the upper contact 58 through wire 59, closed contact 4 of relay N, wires 60 and 61 to terminal 47, and thence through wire 48, resistor 49, and wire 50 to the negative line 27. It will be seen therefore that when the mercury column of thermostat T engages the upper contact 58 of the thermostat the last mentioned circuit is established and thereby by-passes the electric current around the solenoid U of relay V, whereby the relay V is de-energized, and the contact 52 is moved by spring 62 to an open position so as to de-energize the solenoid F of the inlet valve 10 and thereby shut off the supply of heating medium to the overhead heater A.

The thermostat T is preferably positioned in the overhead duct D and is preferably set to function at a temperature of 76° Fahrenheit when the outside temperature is above a predetermined minimum, for example zero degrees. The 76° setting of the said thermostat is accomplished by means of an auxiliary heater 63 which is supplied with current through a circuit leading from positive line 20 through wire 64, a resistor 65, wire 66, wire 67 through the mercury column of outside thermostat X, wires 68, 69 and 70 through the auxiliary heater 63 and thence through wire 71 to the negative line 27. When the outside temperature falls below zero the mercury column of thermostat X will recede below its upper contact and therefore break the electric circuit through wires 67 and 68 so that a second resistor 72 is introduced into the circuit and thereby reduces the amount of current supplied to the auxiliary heater 63. The resistor 72 may have any suitable value but is preferably such as to reduce the functional setting of thermostat T to 70° so that more heat will be delivered from heater A into the compartments of the car. The said thermostat T is adapted to cycle when its mercury column comes within 2° of its functional setting. This cycling action is brought about by means of a cycle resistor 73 which is adapted to add 2° of heat to the auxiliary heater 63 when the inlet valve 10 is open. This resistor circuit leads from wire 53 through wire 74, cycle resistor 73 and wires 75 and 70 to the auxiliary heater 63, and thence through wire 71 to the negative line 27. When the mercury column of thermostat T engages its upper contact 58 it de-energizes and thereby opens the circuit through the cycle resistor just described. The cycling action of thermostat T will continue until the temperature of the air delivered into the compartments of the car reaches the temperature necessary (76° or 70°) to maintain the mercury column in engagement with the said upper contact 58 of the thermostat.

In the event that the occupant of any of the separate compartments desires to obtain less heat than is delivered by the heater A, the occupant of the compartment may adjust the movable arm 75ª toward the left of the variable resistor 39 so as to direct more heating current to the auxiliary heater of the floor thermostat S, S¹, etc. If the occupant desires more heat than is delivered by the primary heating system the said movable arm 75ª is moved to the right of the variable resistor 39 so as to reduce the amount of heat supplied to the auxiliary heater of the floor heat thermostat S, S¹, as the case may be.

HEAT CONTROL

*When outside temperature is above 50° Fahrenheit*

When the outside temperature rises to or above 50° Fahrenheit the outside thermostat P is closed and therefore energizes the solenoid O to move the relay N in a manner to open contacts 1, 2 and 4 and to close relay contacts 3 and 5. The circuit for energizing the said solenoid O leads from positive line 20 through wire 76, resistor 77 to the lower contact of thermostat P, and thence through the mercury column to the upper contact, wire 78, solenoid O, and wire 79 to the negative line. The opening of contacts 1 and 2 of said relay N de-energizes relay solenoids Q, Q¹, etc., so as to bring about the energization of solenoids M, M¹, etc., for closing the floor radiator inlet valves. Consequently there is no heat delivered by the floor radiators in any of the compartments when the outside temperature rises to or above the temperature of 50° Fahrenheit. However, the energization of the said relay N closes its contact 3 and thereby makes the thermostat W available to control the relay V and consequently controls the energization of solenoid F for opening and closing the inlet valve for the air heater A.

The thermostat W is positioned within the car so as to respond to the temperature of the atmosphere therein, for example the air returning to the heater A for recirculation. When the temperature of this air is below the functional setting of the thermostat W the energizing circuit previously described is closed through the relay V so as to energize the inlet valve solenoid F and therefore open the valve. The functional setting of the said thermostat W is preferably the same as the thermostat T, the said setting being obtained by means of an auxiliary heater 80. The circuit for energizing the auxiliary heater 80 leads from the positive line 20 through wire 81, resistor 82, wire 83, through the auxiliary heater 80, and thence through wire 84 to the negative line 27. While the relay V is in its energized position its contact 85 closes an additional heating circuit through the auxiliary heater 80 so as to bring about a cycling action of the thermostat W. This addition of heating circuit leads from positive line 20 through wire 86, closed contact 85, wire 87, cycle resistor 88, wire 83, auxiliary heater 80, and wire 84 to the negative line. The resistor 82 preferably has a value of 2° so that the cycling action of the thermostat W will take place when the mercury column comes with 2° of its outer contact 89. When the temperature of the atmosphere within the car is sufficient to cause the mercury column of thermostat W to permanently engage the outer contact 89 a circuit is established to by-pass the electric current around the solenoid U of relay V so as to permit the relay to open. This circuit through the thermostat W leads from the terminal 44 and follows wire 55 to the upper contact 89 of thermostat W, thence through the mercury column to the lower contact 90, wire 91, closed contact 3 of relay N, wire 92 and wires 60 to terminal 47, thence direct to the negative line through wire 48, resistor 49 and wire 50.

*Cooling function of the temperature control system*

When the temperature of the atmosphere within the car reaches a predetermined point, for example 76° Fahrenheit the cooling control thermostat Y will function to close an energizing circuit through solenoid Z of a cooling control relay Z¹. This energizing circuit leads from positive line 20 through wire 93, closed contact 5 of relay N, wire 94, resistor 95, and wire 96 to the lower contact of thermostat Y, thence through the mercury column of the thermostat to the upper contact 97 thereof, through solenoid Z and wire 98 to the negative line 27. The energization of solenoid Z closes the relay contacts 99 so as to close an energizing circuit through the compressor mechanism and through valve solenoid F¹ for controlling the supply of cooling medium to the air cooler A¹. This energizing circuit leads from the positive line 20 through wire 100, closed contact 99, wire 101, to the compressor mechanism 102 and through the valve solenoid F¹ to the negative line 27. When the cooling mechanism is set to operate by the closing of relay Z¹, the closed contact 103 of relay Z¹ closes a circuit for adding a substantial amount of heating current to the auxiliary heater 80 of thermostat W so as to adjust the functional setting of said thermostat W to a temperature lower than the functional setting of thermostat Y. This heating circuit leads from wire 100 through wire 104, closed contact 103, wire 105, and resistor 106 to wire 83, and thence through the auxiliary heater 80 and wire 84 to the negative line. The resistor 106 may have any suitable value but preferably adds sufficient heat to the auxiliary heater 80 to hold the thermostat W closed for a substantial period after the thermostat Y has receded from its upper contact. In this way the thermostat Y may temporarily relinquish its control of the cooling system and again resume control thereof before the surplus heat is dissipated from the auxiliary 80 of the thermostat W. However, if the temperature of the car body is such as to hold the mercury column of thermostat Y out of engagement with the upper contact 97 the auxiliary heater 80 of thermostat W will cool sufficiently to cause the mercury column of the thermostat to recede from the upper contact 89 and thereby closes an energizing circuit through the relay V to deliver heating medium to the air heater A. The thermostat W will therefore keep control of the temperature control system until the temperature of the enclosed space again reaches the functional setting of thermostat Y.

The fan H functions to supply air to both the heater A and the cooler A¹. It is connected across the line through wires 107 and 108 so that the same is operable during both the heating and cooling cycles of operation.

While the invention is described and will be claimed herein in connection with the control devices and the arrangements herein shown, the invention is not intended to be limited to the specific devices and arrangements for carrying out the functions specified except insofar as the claims are specifically so limited.

I claim:

1. An automatic temperature control system comprising primary and secondary heaters for heating an enclosed space, means including separate control relays for controlling the supply of heating medium to said heaters, means responsive to outside temperatures including a master relay for controlling the energization of said control relays, whereby the secondary heater is rendered ineffective above a predetermined outside temperature, a thermostat connected in a circuit through said master relay for controlling the energization of the control relay for the primary heater, an auxiliary heater for adding heat to the last mentioned thermostat, a circuit for energizing said auxiliary heater having a resistor therein, and a thermostat connected in a shunt circuit around said resistor and adapted to function above a predetermined minimum outside temperature to by-pass electric current around said resistor.

2. An automatic temperature control system comprising primary and secondary heaters for heating an enclosed space, means including separate control relays for controlling the supply of heating medium to said heaters, means responsive to outside temperatures including a master relay for controlling the energization of said control relays, whereby the secondary heater is rendered ineffective above a predetermined outside temperature, a thermostat connected in a circuit through said master relay for controlling the energization of the control relay for the primary heater, an auxiliary heater for adding heat to the last mentioned thermostat, a circuit for energizing said auxiliary heater, and means providing an additional heating circuit for said auxiliary heater connected through the control relay for said primary heater, whereby additional heating current is supplied to the said auxiliary heater when the control relay is closed and thereby cycle said thermostat.

3. An automatic temperature control system comprising primary and secondary heaters for heating an enclosed space, means including separate control relays for controlling the supply of heating medium to said heaters, a thermostat responsive to the temperature of the space for de-energizing the control relay for the secondary heater, means including an auxiliary heater for said thermostat and a variable resistor in its heating circuit for adjusting the functional setting of said thermostat, means responsive to outside temperatures including a master relay for controlling the energization of said control relays, whereby the secondary heater is rendered ineffective above a predetermined outside temperature, a thermostat connected in a circuit through said master relay for controlling the energization of the control relay for the primary heater, an auxiliary heater for adding heat to the last mentioned thermostat, a circuit for energizing said auxiliary heater, and means providing an additional heating circuit for said auxiliary heater and connected through the control relay for said primary heater whereby additional heating current is supplied to the auxiliary heater which controls the functioning of the primary heater.

4. An automatic temperature control system comprising a heater for heating an enclosed space, electrically actuated means including a thermostat responsive to the temperature of heat introduced into the space and a thermostat responsive to the temperature of the space alternatively effective to control the delivery of heating medium to said heater, electrical means responsive to outside temperature changes to shift the heating medium control from one to the other of said thermostats.

5. An automatic temperature control system comprising a heater for heating a stream of air introduced into an enclosed space, electrically actuated means including a thermostat responsive to a predetermined temperature of the air stream and a thermostat responsive to the temperature of the atmosphere within the space which are alternatively effective to control the delivery of heating medium to said heater, electrical means responsive to outside temperature which is to shift the heating medium control from one to the other of said thermostats.

6. An automatic temperature control system comprising apparatus for heating the space and apparatus for cooling the space, a control means for the heating apparatus including a relay and a thermostat for controlling the energization of the relay, a control means for the cooling apparatus including a second relay and a thermostat for controlling the energization thereof, a master relay for connecting circuits through said thermostats, an auxiliary heater for the heating apparatus control thermostat, and means providing an energizing circuit for the auxiliary heater connected through closed contacts of the cooling apparatus control relay, whereby a substantial amount of heat is added to the heating apparatus control thermostat during the operation of the cooling apparatus, whereby the heating apparatus remains inactive for a period of time after the cooling apparatus has ceased its operation.

7. An automatic temperature control system comprising apparatus for heating the space and apparatus for cooling the space, a control means for the heating apparatus including a relay and a thermostat for controlling the energization of the relay, a control means for the cooling apparatus including a second relay and a thermostat for controlling the energization thereof, a master relay for connecting circuits through said thermostats, a thermostat set to function at a predetermined outside temperature to energize said master relay, an auxiliary heater for the heating apparatus control thermostat, and means providing an energizing circuit for the auxiliary heater connected through closed contacts of the cooling apparatus control relay, whereby a substantial amount of heat is added to the heating apparatus control thermostat during the operation of the cooling apparatus, whereby the heating apparatus remains inactive for a period of time after the cooling apparatus has ceased its operation.

8. An automatic temperature control system comprising a heater for heating an enclosed space, a cooler for cooling the space, means for controlling the delivery of heating medium to said heater comprising an electrically energized device, a pair of thermostats for alternatively controlling the energization of said electrically energized device, a thermostatically controlled relay responsive to a predetermined maximum outside temperature for transferring the control of the energization of said device from one to the other of said thermostats, means for controlling the functioning of said cooler comprising a second electrically energized device, an energizing circuit therefor connected through said thermostatically controlled relay to be available when the outside temperature rises to said predetermined maximum, a third thermostat responsive to a predetermined temperature within the enclosed space for closing an energizing circuit through the second electrically energized device, and means for adjusting the functional setting of said other thermostat of said pair to a temperature lower than the functional setting of said third thermostat comprising an auxiliary electric heater for the last mentioned thermostat of said pair and an energizing circuit therefor closed by the functioning of said second electrically energized device.

9. An automatic temperature control system comprising means for delivering a stream of air into an enclosed space, a heater for heating the stream of air, a cooler for cooling the stream of air, means for controlling the delivery of heating medium to said heater comprising an electrically energized device, a pair of thermostats for alternatively controlling the energization of said electrically energized device comprising a thermostat responsive to the temperature of the air stream and is set to function at a predetermined temperature and a thermostat set to function at a predetermined temperature of the enclosed space, a thermostatically controlled relay responsive to a predetermined maximum outside temperature for transferring the control of the energization of said device from the first to the second mentioned thermostat of said pair, means for controlling the function of said cooler comprising a second electrically energized device, an energizing circuit therefor connected through said thermostatically controlled relay to be available when the outside temperature rises to said predetermined maximum, a third thermostat responsive to a predetermined temperature within the enclosed space for closing an energizing circuit through the second electrically energized device, and means for adjusting the functional setting of said second thermostat of said pair to a temperature lower than the functional setting of said third thermostat comprising an auxiliary electric heater for the last mentioned thermostat of said pair and an energizing circuit therefor closed by the functioning of said second electrically energized device and adapted to supply an abundance of heating current to said auxiliary heater, whereby its thermostat will retain its lower setting for a time after the auxiliary heater circuit is opened.

10. An automatic temperature control system comprising means for delivering a stream of air into an enclosed space, a heater for heating the stream of air, a cooler for cooling the stream of air, means for controlling the delivery of heating medium to said heater comprising an electrically energized device, a pair of thermostats for alternatively controlling the energization of said electrically energized device comprising a thermostat responsive to the temperature of the air stream and set to function at a predetermined temperature and a thermostat set to function at a predetermined temperature of the enclosed space, a thermostatically controlled relay responsive to a predetermined maximum outside temperature for transferring the control of the energization of said device from the first to the second mentioned thermostat of said pair, an auxiliary electric heater for the last mentioned thermostat, an energizing circuit therefor having a cycle resistor therein of fixed temperature value, which circuit is closed by the energization of said electrically energized device, whereby the said second thermostat is caused to cycle for a temperature range equal to the value of said resistor, means for controlling the functioning of said cooler comprising a second electrically energized device, an energizing circuit therefor connected through said thermostatically controlled relay to be available when the outside temperature rises to said predetermined maximum, a third thermostat responsive to a predetermined temperature within the enclosed space for closing an energizing circuit through the second electrically energized device and means defining a second flow path of electric current to the auxiliary heater of the second thermostat, the said additional flow path for electric current being connected through the second electrically energized device and adjust the functional setting of the second thermostat to a temperature lower than the functional setting of said third thermostat, whereby the second thermostat is rendered ineffective for a period of time after the third thermostat has relinquished its control of the system.

TIMOTHY J. LEHANE.

REFERENCES CITED

The following references are of record in the file of this patent:

UNITED STATES PATENTS

| Number | Name | Date |
|---|---|---|
| 2,080,444 | Stewart | May 18, 1937 |
| 2,182,449 | Parks et al. | Dec. 5, 1939 |
| 2,346,592 | Lehane et al. | Apr. 11, 1944 |